(No Model.)

G. AMBORN, Jr. & E. D. CHAPLIN.
HAND VISE.

No. 282,033. Patented July 31, 1883.

WITNESSES:
Charles H. Bloodgood
James S. Crook

INVENTORS
George Amborn Jr.
Edwin D. Chaplin

UNITED STATES PATENT OFFICE.

GEORGE AMBORN, JR., AND EDWIN D. CHAPLIN, OF PAWTUCKET, R. I.

HAND-VISE.

SPECIFICATION forming part of Letters Patent No. 282,033, dated July 31, 1883.

Application filed June 13, 1883. (No model.)

*To all whom it may concern:*

Be it known that we, GEORGE AMBORN, Jr., and EDWIN D. CHAPLIN, of Pawtucket, in the county of Providence and State of Rhode Island, have invented certain new and useful Improvements in Hand and other Vises, of which the following is a full and correct description, reference being had to the accompanying drawings, forming a part of this specification.

The object of this improvement is to obtain greater pressure in closing the jaws of a vise upon an object, and at the same time retain the usual facilities for opening and closing them quickly. This we accomplish by means of the compound or differential screw, hereinafter described, and which is illustrated in the accompanying drawings, in which—

Figure 1:
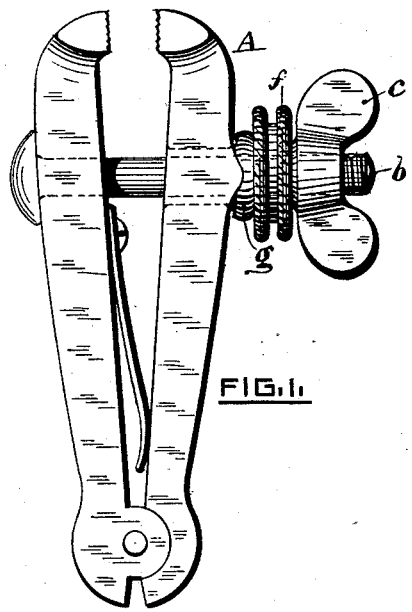
Figure 2:
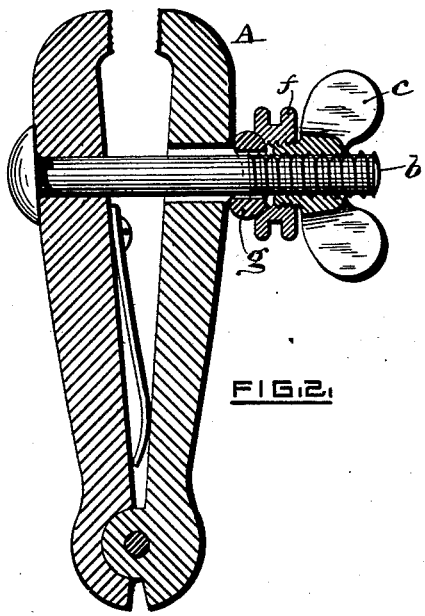
Figure 3:
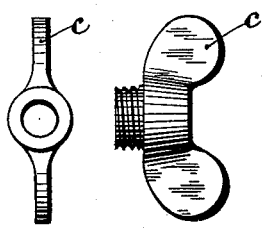
Figure 4:
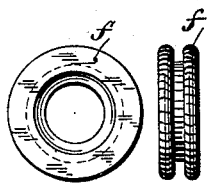
Figure 5:
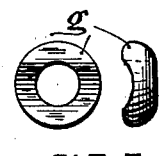

Figure 1 shows a side elevation of a hand-vise with the improvement. Fig. 2 is a vertical section of the same, except the screw, taken through the axis of the screw. Fig. 3 shows front and side views of the thumb-nut $c$. Fig. 4 shows front and side views of the auxiliary nut $f$. Fig. 5 shows like views of the friction-collar $g$.

A represents a hand-vise, with a screw-bolt, $b$, passing through the jaws in the usual way.

$c$ is a thumb or winged nut fitted with a screw-thread to work on the screw $b$. The hub of the thumb-nut $c$ is lengthened out toward the vise, and has a screw-thread cut on its outside of a finer pitch than the thread made on the screw $b$, but running in the same direction—that is to say, if the thread on the screw $b$ is right handed, the screw-thread on the hub of the thumb-nut $c$ should also be a right-hand one. An auxiliary nut, $f$, milled on its edges, has a screw-thread made in it to fit on the threaded hub of the thumb-nut $c$. The side of this nut $f$ that is turned toward the jaw of the vise has a concave recess made in it, as seen in section in Fig. 2.

A collar, $g$, is made to go between the auxiliary nut $f$ and the jaw of the vise, the outer side of the collar being made with a convex projection fitting into the recess, before mentioned, in the nut $f$. The other side of the collar $g$ has one or more notches made in it to receive a projection (one or more) formed on the jaw of the vise; or the notches may be made in the vise-jaw and the projections on the collar, if preferred. This collar $g$ is for the purpose of increasing the friction between the nut $f$ and the jaw of the vise.

The operation of these devices is as follows: When the jaws of the vise are to be opened or closed quickly, or without regard to the pressure exerted, the thumb-nut $c$ is turned in the proper direction, carrying with it the auxiliary nut $f$, by reason of the friction of that nut on its screw, and while there is no resistance to the closing of the jaws but that of the usual spring; but if that friction is not sufficient to move the nut $f$, the thumb and finger on the thumb-nut may be extended over to reach the milled edge of the nut $f$ and turn it with the other nut. When the jaws begin to pinch on an object between them, the friction between the collar $g$ and the recess in the nut $f$ will be increased by the pressure, and the nut $f$ will be held stationary, so that the thumb-nut $c$ will screw into it, and the effect will be that if the screw $b$ has a thread of sixteen to the inch and the hub of the thumb-nut $c$ has a thread of eighteen to the inch, while one turn of the thumb-nut will advance it on the screw $b$ one sixteenth of an inch, the milled nut $f$ will fall back one eighteenth of an inch, and the difference between the two—one one-hundred-and-forty-fourth of an inch—will represent the actual movement of the jaws of the vise toward each other. The ratio of pressure produced being inversely as the difference between the two movements, it follows that the jaws will be closed with a force of one hundred and forty-four to sixteen—that is to say, with nine times the power, minus the friction of the nut $f$, that would be exerted in using the screw $b$ and thumb-nut $c$ in the usual way.

We have here represented our improvement as applied to a hand-vise; but it is equally applicable to bench-vises and in vises having a parallel jaw movement. The collar $g$ may be dispensed with, and the convex projection on it formed on the jaw of the vise instead.

Having thus described our improvement, what we claim as our invention, and desire to secure by Letters Patent, is—

1. The combination, with the jaws of a vise, of the screw $b$, thumb-nut $c$, and auxiliary nut $f$, constructed and operating substantially as herein described, and for the purpose set forth.

2. The combination, with the jaws of a vise, of the screw $b$, thumb-nut $c$, auxiliary nut $f$, and friction-collar $g$, substantially as herein described, and for the purpose specified.

GEORGE AMBORN, JR.
EDWIN D. CHAPLIN.

Witnesses:
CHARLES H. BLOODGOOD,
JAMES S. CROOK,